INVENTORS
JOHN PRESPER ECKERT, JR
THEODORE H. BONN
BY
ATTORNEY

INVENTORS
JOHN PRESPER ECKERT
THEODORE H. BROWN
BY
Sheldon Kapustin
ATTORNEY

INVENTORS
JOHN PRESPER ECKERT, JR.
THEODORE H. BONN
BY
Sheldon Kapustin
ATTORNEY INVENTORS
JOHN PRESPER ECKERT JR.
THEODORE H. BONN
BY
Sheldon Kapustin
ATTORNEY INVENTORS
JOHN PRESPER ECKERT, JR.
THEODORE H. BONN
Sheldon Kapustin
ATTORNEY United States Patent Office 2,997,599

Patented Aug. 22, 1961

2,997,599

SIGNAL TRANSLATING DEVICE

Theodore H. Bonn, Merion Station, and John Presper Eckert, Jr., Gladwyne, Pa., assignors to Sperry Rand Corporation, New York, N.Y., a corporation of Delaware Original application Sept. 24, 1953, Ser. No. 382,180, now Patent No. 2,892,998, dated June 30, 1959. Divided and this application June 25, 1959, Ser. No. 826,386

20 Claims. (Cl. 307—88)

This application is a division of our copending application Serial Number 382,180, filed September 24, 1953, now Patent No. 2,892,998.

The invention disclosed herein relates to magnetic amplifiers and is particularly concerned with such devices that drive a plurality of loads or a single load having a varying impedance. It will be appreciated, in the case of the amplifier driving a plurality of loads, that some or all of these load elements may be selectively decoupled from the amplifier output.

The amplifier defined in the instant application finds great utility in large digital computing systems. In such systems a magnetic amplifier may be called upon to drive a plurality of different loads which may comprise other amplifiers or gating arrays. The condition of these plural load elements will, from time to time, vary as the computer in which they are used performs different instructions. Accordingly, an amplifier employed in the aforementioned arrangement, will be driving a load which varies from instruction to instruction. One of the problems encountered when a magnetic amplifier drives a plurality of selectively coupled loads is that the output waveform of the driving magnetic amplifier will vary as a function of the variation in the load. In particular, the duration as well as the amplitude of the output pulse from the driving amplifier will increase or decrease as the number of load elements, which it is driving, changes. It has been found that an output pulse whose duration decreases or increases (that is, is not constant) is ofttimes unsuitable for gating or other logical operations in a computer.

This problem becomes acute when the driving amplifier is itself driven from a current source. However, it has been found that by employing a clamping circuit, operatively connected to the output of the driving amplifier, the amplitude of the output waveform may be made constant. This same desired result can also be obtained by connecting a clamping element to the current source, as shall be later described.

As disclosed in our parent application, amplifiers of the type utilized here may employ ferromagnetic materials. Such ferromagnetic materials exhibit a hysteresis loop and display a high impedance when operating over a portion of this loop from minus residual flux density to plus residual flux density, and show a low impedance when traveling from plus residual flux density toward plus saturation flux density. Use can be made of these effects for signal translating and amplifying purposes. A way of using this effect is to produce the desired output when and while the core occupies the high impedance portion of its hysteresis loop. The present invention covers devices using this effect which drive loads of the type aforedescribed. These amplifiers may be conveniently referred to as "parallel" signal translating or amplifying devices.

It is, therefore, a primary object of this invention to provide a new magnetic apparatus.

Another object of this invention is to provide a new magnetic amplifier having an output constant in amplitude and/or duration.

Yet another object of this invention is to provide a new magnetic amplifier having an output constant in amplitude and/or duration notwithstanding a change in the load which the magnetic amplifier is driving.

Other objects and advantages of the invention will become apparent from the following description and accompanying drawings, in which.

Figure 2A:
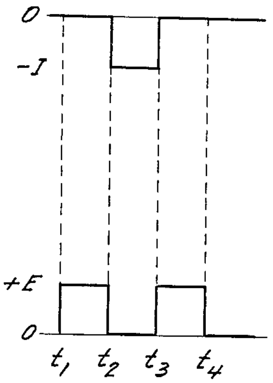
FIGURE 2 shows a basic circuit of a solid-state signal translating device.
Figure 2:
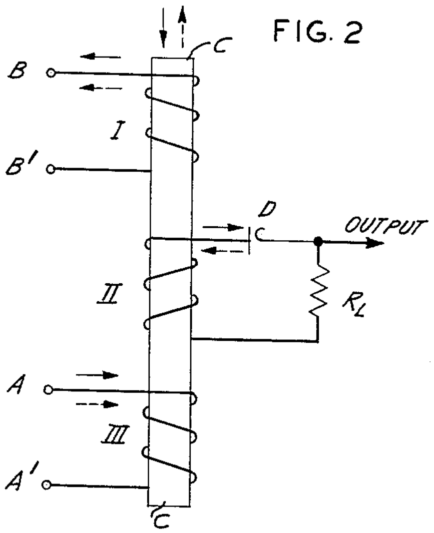
Figure 3:
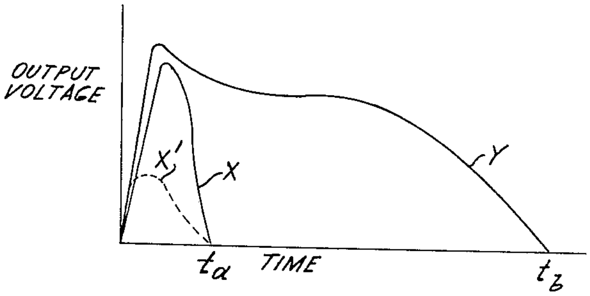
Figure 4:
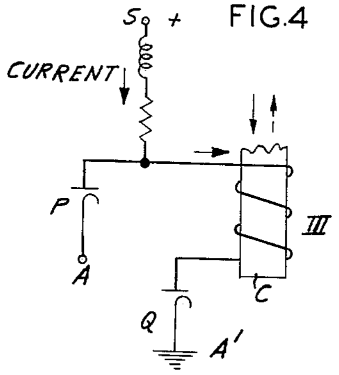
Figure 5:
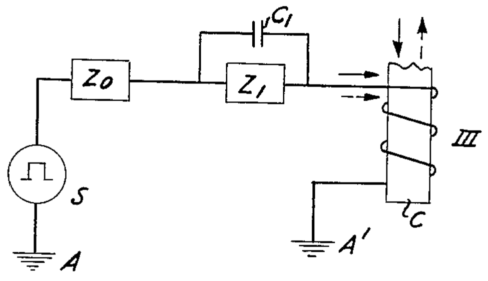
Figure 6:
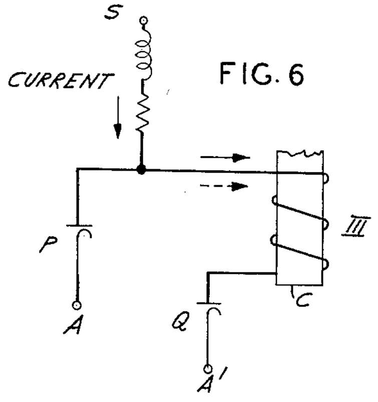
Figures 6A, 6B, 6C:
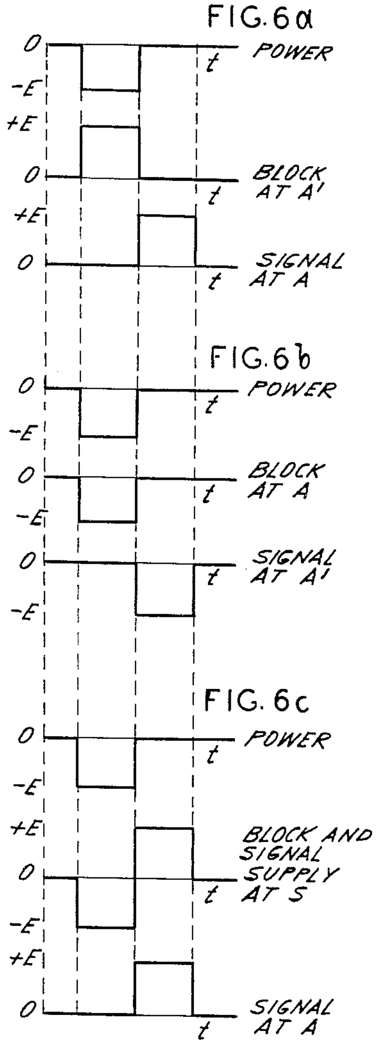

FIGURE 2*a* illustrates the operating time cycle for the embodiment of FIGURE 2;

FIGURE 3 illustrates some representative output waveforms;

FIGURE 4 shows an input winding with a constant current input;

FIGURE 5 shows an input winding with a constant voltage input;

FIGURE 6 shows an input winding to be used in connection with the application of a constant current and the use of diodes and blocking pulses;

FIGURE 6*a* represents a first operating time cycle for the circuit of FIGURE 6;

FIGURE 6*b* represents a second operating time cycle for the circuit of FIGURE 6.

FIGURE 6*c* represents a third operating time cycle for the circuit of FIGURE 6.

Figure 10:
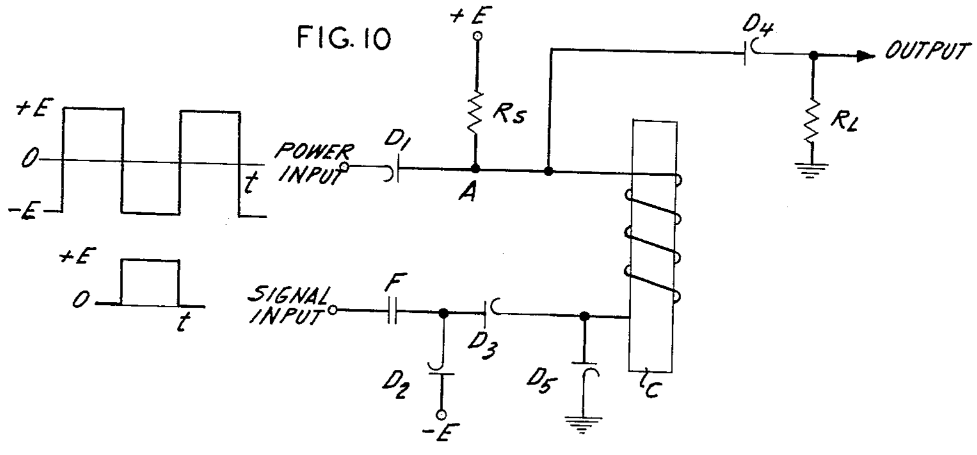
Figure 7:
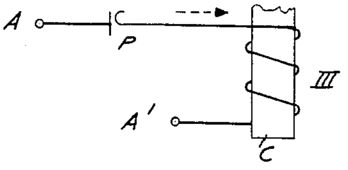
Figure 7A:
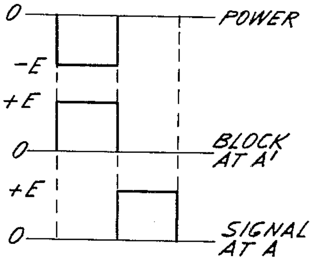
Figure 8:
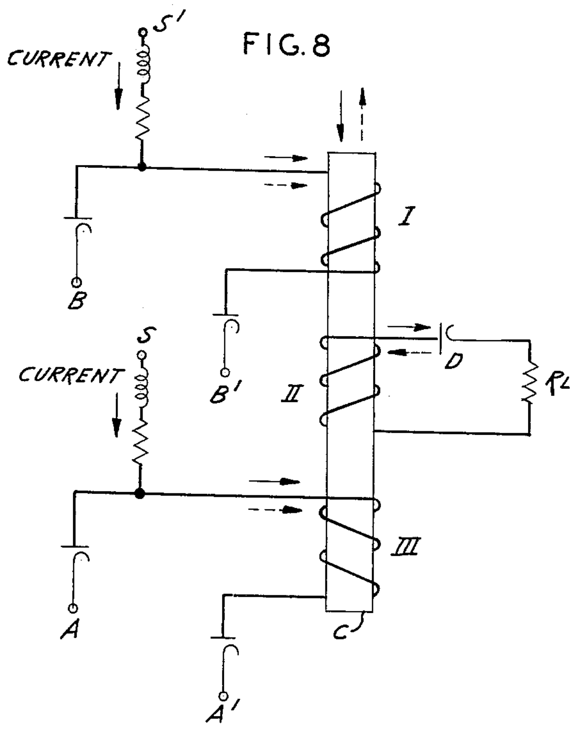
Figure 8A:
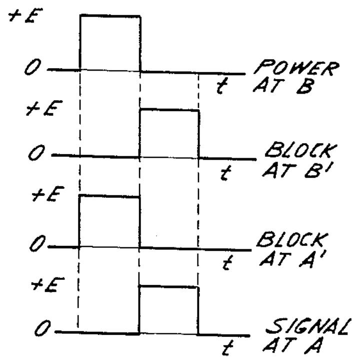
Figure 9:
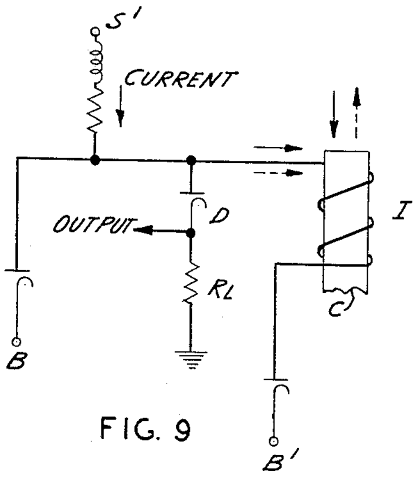
Figure 9A:
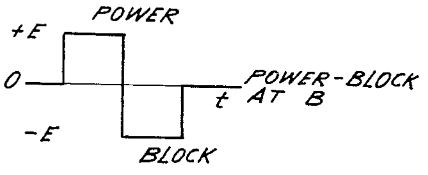
Figure 11:
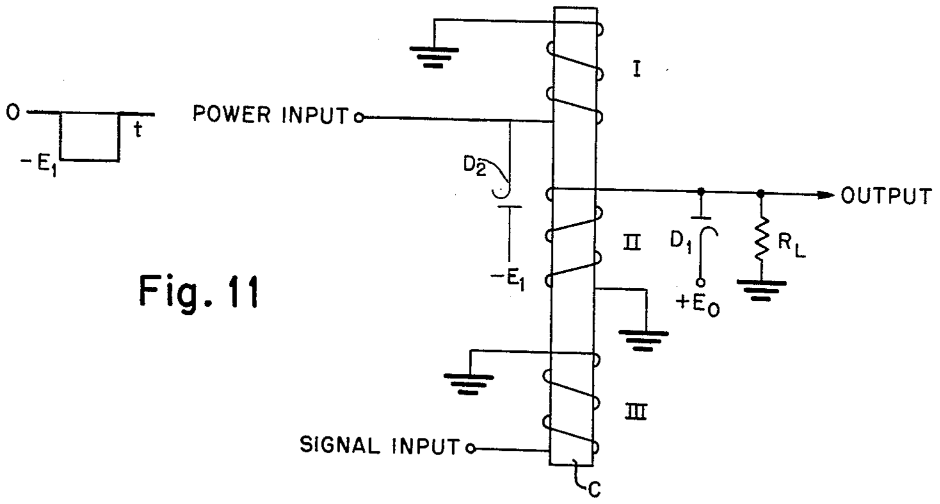

FIGURE 7 illustrates an input winding to be used in connection with the application of a constant voltage;

FIGURE 7*a* shows the form of pulses to be applied to the circuits of FIGURE 7;

FIGURE 8 illustrates the three windings of a magnetic signal translating device to which D.C. power sources may be applied;

FIGURE 8*a* shows the pulse forms to be used in connection with the arrangement of FIGURE 8;

FIGURE 9 illustrates an arrangement in which the output is directly connected to the power winding;

FIGURE 9*a* shows a wave form which serves both as a power pulse and as a blocking pulse;

FIGURE 10 exemplifies the circuits of a single coil magnetic signal translating device; and FIGURE 11 shows a three winding signal translating device with the output and power pulse circuit so arranged as to keep the output voltage produced by the amplifier constant in amplitude and duration.

It is to be understood that the invention is not limited to any specific geometries of the cores nor to any specific materials therefor, and that the examples given are illustrative only. The only requisite is that the material possesses a hysteresis loop preferably approaching the idealized hysteresis loop as shown in FIGURE 1.

Before describing the signal translating devices, the terms to be used in regard to different kinds of electric pulses will be defined. There are clock pulses and signal pulses. The signal pulses carry information and are, therefore, selectively applied. It depends upon the information to be transmitted whether such pulses are present or not. The clock pulses are automatically applied and do not carry any information. They may be subdivided into power pulses and blocking pulses. The power pulses usually supply the power for the operation of the signal translating device or, at least, open a gate to permit another source to operate the signal translating device. The blocking pulses block the interference of the power pulse with the signal input circuit and/or of the signal input circuit with the power circuit.

FIGURE 2 illustrates the basic arrangement of parts of a solid-state magnetic signal translating device. Part C is a core of ferromagnetic material. Winding I is the power winding, winding II is the output winding and winding III is the input winding. Power pulses are applied to winding I at, for example, terminal B. The solid arrow at terminal B indicates the direction of current of the power pulse. The solid arrow above core C indicates the direction of flux that this current causes in core C. A typical shape of the power pulse versus time is shown in the waveform of FIGURE 2*a* to the left of terminal B. This power pulse causes a current to flow in the load resistor $R_L$ in the direction shown by the solid arrow near winding II. The power pulse also causes a current to flow in winding III in the direction of the dotted arrow shown at terminal A. When a signal pulse is applied to terminal A of the signal winding, a current is made to flow in the signal winding in the direction of the solid arrow shown near terminal A. The waveform of FIGURE 2*a* to the left of terminal A is a typical waveform which might be applied to terminal A. The vertical lines connecting the waveforms of FIGURE 2*a* indicate the time relationship between the signal input pulse, which may or may not be present at terminal A, and the power pulse which occurs at terminal B.

Figure 1:
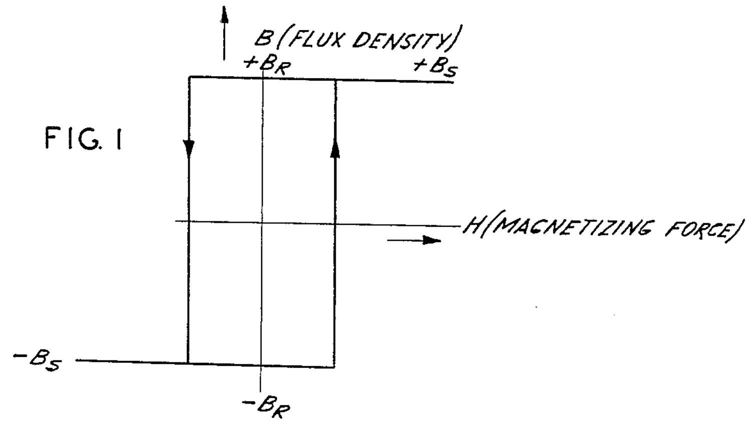
FIGURE 1 is a diagram of an idealized hysteresis loop.

The idealized BH loop of FIGURE 1 is a convenient means for describing the method of operation of the signal translating device. First, it will be assumed that there are no information pulses and that the power pulse is in such a direction as to drive core C from plus $B_R$ to plus $B_S$. In this event, there is a small flux change in the core, and hence an output voltage will be generated which, as a rule, is short in duration and, in the case of some materials, also small in amplitude (sneak pulse).

FIGURE 3 shows representative output waveforms. Waveforms X and $X^1$ are the types which would occur in the case just discussed, namely in the absence of an information pulse preceding the power pulse. The exact size and shape of these waveforms is determined by a number of factors, for example, the slope of the BH loop between $B_R$ and $B_S$, the amplitude and wave shape of the power pulse, the value of the load resistance, the power circuit inductance, eddy current phenomena in the core, distributed capacitances of the winding, etc.

Now, however, it will be assumed that an information pulse has occurred preceding the power pulse. When the preceding power pulse returned to 0, it left the core in the plus $B_R$ position. The information pulse causes the material to travel from plus $B_R$ to minus $B_R$ in a counter-clockwise direction around the hysteresis loop. There is a large change of flux. Any currents which tend to flow in circuit II, the load circuit, are blocked by the diode D. Therefore, the only power which must be supplied from the information pulse is that power required to move the core from plus $B_R$ to minus $B_R$ and the power transferred to circuit I, the power circuit. Effective means have been found to block power transfer to the power circuit, as will be explained hereinafter. Therefore, the only power consumed from the signal input circuit is the power absorbed by the core in moving from plus $B_R$ to minus $B_R$ in the given time. After the period of time allotted to the signal pulse, the power pulse occurs and the core now starts from minus $B_R$ and proceeds to plus $B_R$. The core undergoes a large flux change and a large voltage is induced in winding II.

Curve Y, FIGURE 3, shows a representative output voltage versus time curve obtained when the material is operated between minus $B_R$ and plus $B_R$. The length of the output signal approximately equals the duration of the power pulse. Note that the current induced, which is in the direction of the solid arrow at winding II, FIGURE 2, is in the direction which will pass through the diode D.

The power delivered to the load may be many times larger than the power required of the information pulse. A net power gain is, therefore, obtainable in the signal translating device. Many factors influence the amount of power obtained. One of the most important factors, however, has to do with the extent to which the unwanted pulse known as the sneak pulse and shown at X or $X^1$ in FIGURE 3, may be tolerated in any practical situation. Another important factor is represented by the ratio of the slope on the steep portion of the hysteresis loop between plus $B_R$ and minus $B_R$ to the slope of the flat portion of the hysteresis loop between plus $B_R$ and plus $B_S$. A material with a rectangular hysteresis loop is desirable for this signal translating device, although by no means completely necessary.

Thus, the fundamental method of operation of this translating device has been shown. When no information pulses are applied, the material goes from plus $B_R$ to plus $B_S$ and returns to plus $B_R$; only a sneak pulse as X or $X^1$ in FIGURE 3 results across $R_L$. When a signal pulse has been received, the material moves from plus $B_R$ to minus $B_R$; an output as Y in FIGURE 3 results across $R_L$, and the material returns to plus $B_R$. Thus, the desired output signal occurs when and while the material travels within the steep middle portion of the loop where the permeability is at its greatest.

A signal translating device operating in the manner just described will be designated hereinafter as an "amplifier." It should be understood, however, that the use of the term "amplifier" is not confined to cases of actual amplification, but extended to cover all devices which produce the desired output signal in response to the application of an input signal, regardless of the fact that the power, current or voltage ratio may be greater than, equal to or less than unity. If, in contrast thereto, the desired output signal is produced in response to the non-application of an input signal, then the device will be called a "complementer."

It also should be realized that the device illustrated in FIGURE 2 as all the other devices described hereinafter operate as so-called "parallel" magnetic amplifiers or complementers. This means that the load circuit or circuits are arranged in a parallel relationship to the core when viewed from the power source, the power being supplied, in the average case, by a constant current source. The desired output signals are produced, therefore, through changes in the residual flux density which, as a rule, follow the path of the hysteresis loop and keep the core within the high permeability region, i.e., between plus and minus $B_R$.

In FIGURE 2, the load on circuit II is shown as a resistor. However, this might very well be any passive or active network including resistors, capacitors, inductors, any conceivable combination thereof, computing circuits, buffers, gates and other amplifiers.

In the waveforms illustrated in FIGURE 2*a*, the power pulse is shown occurring coincident with the end of the signal pulse. The time period $t_1$ marks the beginning of the signal pulse, $t_2$ marks the end of the signal pulse and the beginning of the power pulse, and $t_3$ marks the end of the power pulse. Actually, $t_1$, $t_2$ and $t_3$ mark the boundaries of the periods allotted the signal and power pulses and by no means indicate the length of these pulses. The period $t_1$ and $t_2$ may be relatively long time as, for example, one minute, and the actual signal pulse may have a duration of one microsecond. This one microsecond can occur at any time during the one minute period allotted to the signal. The power pulse, since it always occurs, is given a period equal to its duration. Its duration may be either greater or less than the actual duration of the signal pulse, and it may be applied at any time after the signal pulse. Therefore, this amplifier may also serve as a memory or a delay device. In view of the fact that the power pulse is derived from a source whose waveform can be accurately fixed, output pulses from this amplifier are of standard waveforms as determined by the power pulse source. This amplifier serves also, therefore, as a pulse former and pulse timing device.

In some instances, it may be desirable to obtain the amplifier information at some time which is not necessarily fixed. In this case, pulses applied to coil I may also be selectively controlled information pulses. Then the amplifier functions as a delayed gate. The information pulse applied to coil III selectively allows an output to occur when such output is selectively called for by an information pulse on coil I.

In FIGURE 2, the amplifier is shown with one signal input, one output and one power winding. Actually, a signal amplifier may have many signal input, output and power windings. Thus, it is possible for the amplifier to be operated by one of several sources and/or to operate several loads. These sources and/or loads can have different impedance and voltage levels and different polarities. The number of turns on the various windings would be adjusted to match the characteristics of the particular circuit.

Several input circuits will now be shown to handle the various problems which arise in operating this type of solid-state amplifier with both constant current and constant voltage sources. It should be stressed, in this connection, that the power pulse applied to coil I (the power winding) may, preferably, be taken from a constant current source.

A constant current source is theoretically a source of infinite impedance. A constant voltage source is theoretically a source of zero impedance. These definitions are idealized and are merely used to obtain a simplification in the analyses of circuits. From a practical point of view, the constant current source is a source whose impedance is comparatively high with respect to the load, and a constant voltage source is a source whose impedance is comparatively low with respect to the load.

FIGURE 4 represents a constant current input source which can be used with this type of amplifier. The portion of the core C shown corresponds to coil III of FIGURE 2. The directions of the currents, voltages, and fluxes shown are the same as those in FIGURE 2. Normally, when no signal is applied to terminal A, terminal A is at a small negative potential such that the potential on the plate of diode P is zero, and the current from the constant current source S flows through the diode P in series with A, and no current flows through coil III. In order to relax the tolerance requirements on this negative voltage, a diode Q may be inserted as shown in series with terminal $A^1$. If Q is present, the small negative voltage may be larger and diode Q will cut off. Reverse current will thereby be prevented from flowing in coil III. When an input is desired, a positive pulse is applied to terminal A; the diode P, in series with A, cuts off; and the current which formerly flowed through A now flows in coil III in the direction shown by the solid arrow. This principle is also applicable to the means for producing the power pulse. In this case, the actual power source would be the D.C. source of constant current and the source of switching pulses which cause this current to flow in coil III at the required time.

FIGURE 5 shows a constant voltage type of input in which the signal source S is theoretically an impedanceless source. The same portion of the core C as in FIGURE 4 is shown here. $Z_0$ is the internal impedance of a practical source and $Z_1$ is an impedance placed in series with the input coil III of the amplifier. The signal source S is selectively actuated to apply an input pulse. By placing a capacitor $C_1$ across $Z_1$ a faster change in current can be obtained.

In the previous descriptions, both the signal and the power pulse were shown as square waves. In practice, many waveforms are possible. It is essential, however, that the signal pulse, if selectively applied, is present during the signal period. Whether or not this signal impulse may extend into a power pulse period, depends upon the characteristics of the other elements in the overall circuit system within which this amplier is to be used. If the time integral of the signal voltage during the signal period is equal to or greater than $2\times10^{-8}$ $B_RAN$ volts (where A is the area of the magnetic circuit in square centimeters, $B_R$ is in gauss and N the number of turns), then full output is obtained from the amplifier. If, on the other hand, the time integral of the signal voltage is less than $2\times10^{-8}$ $B_RAN$ volts, an output proportionately smaller than the full output will be obtained. This effect may be used to make a lower power amplifier without decreasing the volume of magnetic material present. Therefore, it is not necessary, and indeed may not be desirable, that the amplifier operate with the full excursion between plus $B_R$ and minus $B_R$ as stated hereinabove.

One of the important problems connected with these ampliers is the method of preventing power pulses from delivering energy to the signal input winding and the method of preventing the signal winding from delivering energy to the output winding. Several methods or combinations of methods can be used. One simple case occurs when the power winding is connected to a high impedance source. In this case, the high impedance itself prevents energy transfer from the signal to the power winding. Various combinations of diodes and blocking voltages can also be used on both signal and power windings.

FIGURE 6 is an example of how diodes and blocking pulses can be used to isolate the power winding from the input or the input from the power winding, whenever a constant current source is used for the input winding. (In the case of coil I (the power winding), the application of a constant current source may be regarded as a rule.) The portion of core C containing the input winding as in FIGURE 2 is redrawn in FIGURE 6. A similar arrangement may be used for the power circuit, but the diode corresponding to diode P would not be necessary in such a case, provided that the point corresponding to point S is connected to a device which prevents any back flow of current. The waveforms applied in one method of using this principle are shown in FIGURE 6*a*. The pulse applied to the power winding is shown. At the same time, a positive pulse is applied to point $A^1$ from a blocking source. This cuts off the diode Q in series with $A^1$ and prevents flow of current which, as a result of transformer action, would try to flow as shown by the dotted arrow. The blocking pulse has the same or greater duration as the power pulse and sufficient amplitude to prevent the flow of current. At some later time, as previously described, a signal pulse is applied to point A. FIGURE 6*b* shows an alternate method for accomplishing this result. Here the blocking pulse is applied to the point A and the signal to point $A^1$. In this case, the polarities of both the blocking pulse and the signal are negative.

Another method for accomplishing the same thing is shown in FIGURE 6*c*. The power pulse is the same as previously described. Now, however, a waveform as shown in the second line is applied to terminal S. This waveform is called the block and signal supply because it is of the correct polarity to block during the power pulse period, and it can supply power to the signal winding in the event that a waveform, as shown in the last line, appears at point A. Point $A^1$ would be grounded in this case, and diode P may be eliminated.

FIGURE 7 shows a method of isolating the power pulse from the input when using a constant voltage source. Here again only coil III and part of core C, as in FIGURE 2, are shown. A power pulse is applied as shown in FIGURE 7*a*. During the period of the power pulse, a blocking voltage from a low impedance source is applied at point $A^1$. This acts to cut off the diode P in series with terminal A and prevents current from flowing in the direction of the dotted arrow. This is the direction in which the power pulse would tend to make the current flow. A signal pulse as shown in the bottom waveform of FIGURE 7*a* is selectively applied at point A.

FIGURE 8 shows an amplifier having both D.C. power sources and blocking pulses applied to both power and signal windings in an amplifier. The waveforms of the voltages applied to the amplifier of FIGURE 8 are shown in FIGURE 8*a*. A power pulse is applied as shown at point B and the constant current from $S^1$, which normally would flow to B, is made to flow through coil I. Similarly, a blocking voltage is applied at point $A^1$. During the signal period, a positive signal pulse is applied to terminal A and the current from S, which normally would flow through A, is made to flow through coil III. A positive blocking voltage is applied at point $B^1$. Note that if a signal pulse does not occur, the block is applied anyhow so that the signal source does not have to supply power required to block. The application of the block in no way harms the operation of the amplifier.

In the preliminary description of the operation of the amplifier, the output winding was shown as a separate winding II of FIGURE 2 and other figures. However, it is not necessary that this be so. The output may be connected as shown in FIGURE 9, i.e., across the power winding I with the diode D in series with the load $R_L$. The input and output waveforms are the same as shown before. The previously discussed principles, for example, those of FIGURE 8, can be still applied to this circuit. A block such as applied at $B^1$, FIGURE 8, can also be applied at $B^1$, FIGURE 9. A power pulse can be applied at B, FIGURE 9, or if terminal B is eliminated, it can be applied at point $S^1$, as described in connection with FIGURE 6*c*. The power pulse applied at B may also serve as a blocking pulse if it is allowed to go negative, as shown in FIGURE 9*a*. In this case point $B^1$ would be grounded.

A magnetic amplifier may be constructed having only one coil on a core of ferromagnetic material. An example of a single coil magnetic amplifier is shown in FIGURE 10. This amplifier has a constant current applied via resistor $R_S$. During the power period, when the power input has a positive pulse applied thereto, diode $D_1$ cuts off and current flows through resistor $R_S$, the amplifier coil and diode $D_5$, in series, and through diode $D_4$ and the load resistor $R_L$. Assuming that there has been no signal input, the core will be at plus $B_R$ flux density, when the power pulse arrives, and will travel from plus $B_R$ to plus $B_S$, and there will be only a small voltage across $R_L$, and only a sneak output pulse will result.

During the signal input period, a negative pulse is applied to the power input. Diode $D_1$ will connect, and point A will be at the potential of the negative pulse applied to the power input. Diodes $D_4$ and $D_5$ will disconnect, and no current will flow through the amplifier coil. If a signal input is applied at this time through capacitor F, diode $D_3$ will connect, and a current will flow through the amplifier coil in the reverse direction, driving the core from plus $B_R$ flux density to minus $B_R$ flux density. Then, during the next power pulse, the core will travel from minus $B_R$ to plus $B_R$ and a large output will result.

Referring now to FIGURE 11 there is shown an embodiment of a magnetic amplifier comprising circuitry for ensuring the output thereof remains constant in amplitude and duration notwithstanding a change in the load to which the amplifier is connected.

The preferred embodiment of the magnetic amplifier comprises a ferromagnetic core C having three windings I, II, and III coupled thereto, and operates in much the same way as the amplifier just described in connection with FIGURE 8. A current source (not shown) producing pulsating waveforms is connected through one terminal, marked "power input," of power pulse winding I to ground. Electric pulses, such as exhibited at the left of FIGURE 11 from the current source, tend to drive the core C to one stable state of magnetic saturation, e.g. $+B_S$ (FIGURE 1). Another winding III associated with core C receives signal inputs from a selectively operable source (not shown). These signal inputs in a manner described above tend to drive the core C to another state of magnetic saturation, e.g. $-B_S$. A load winding II also associated with core C has one of its terminals connected to ground, and another of its terminals connected to the anode of diode $D_1$ as well as one end of load element $R_L$. The cathode of diode $D_1$ is connected to a source of positive potential of $+E_0$ volts. The remaining end of load element $R_L$ is connected to ground so that this element is in parallel with winding II. The pictorial representation of load element $R_L$ is meant to illustrate a plurality of different loads, any number of which may be selectively placed in the parallel circuit just described, or may be considered as a load element whose impedance varies.

When the core C switches magnetic state (e.g. from $-B_S$ to $+B_S$, see FIGURE 1) in response to a pulse from the current source connected to winding I, a positive output is developed across winding II, and load element $R_L$. The magnetomotive force of the input current from the current source divides between the output, i.e. the load, and the core losses. The following equation holds: $I_P=I_C+I_L$ where $I_P$ equals the current from the source connected to winding I; $I_L$ equals the load current; and $I_C$ equals the current due to the core losses. If the load element should be high, then the current $I_L$ will be small, and the current $I_C$ will be large. Accordingly, the core C will switch from one magnetic state to another in a short time due to the large driving current available and a high switching voltage results. The switching volt-seconds of the core C is a constant and under these circumstances the peak value and the duration of the output pulse developed across winding II will vary as the load element varies. This, as previously explained, is highly undesirable in large digital computing systems.

The addition of clamping diode $D_1$ connected as described to voltage source $+E_0$ corrects this undesirable situation. If the output voltage at the anode of diode $D_1$ exceeds clamp voltage $+E_0$, then the diode $D_1$ will conduct and an additional term is added to the above equation. A new equation as expressed below now holds: $I_P=I_C+I_L+I_{D1}$ where $I_{D1}$ is the current which flows through clamping diode $D_1$.

As long as diode $D_1$ conducts, the amplitude of the output voltage will be regulated to be equal to a value of $+E_0$, and hence the duration of the output pulse will be constant, regardless of variations in the load element $R_L$. This is true because the product of the amplitude and time of the output voltage is related to the switching time of the core C. If the output voltage is maintained constant and the switching volt-seconds is known to be constant, then the duration of the output pulse will be held also constant.

In operation, the maximum value of the load current is chosen so that a least a small current always flows through clamping diode $D_1$. Then the load current may vary between zero and the maximum chosen above with substantially no change in the amplitude and duration of the output pulse developed across winding II.

The same effect may be accomplished by using a clamping arrangement, comprising diode $D_2$ and voltage source $-E_1$, at the input of the power winding I. In this case diode $D_2$ will limit the amplitude of the voltage across the power winding I to a value of $-E_1$ which will maintain constant both the amplitude and duration of the output for the reasons given before. It should be understood that only one of these clamping arrangements is needed.

While the preferred embodiment shows clamping diode used in connection with a three winding parallel magnetic amplifier, it will be appreciated from the teachings herein that such an arrangement is readily adaptable to the two winding or one winding magnetic amplifiers shown and described in connection with FIGURES 9 and 10, respectively.

Having thus described our invention, we claim:

1. The combination comprising a magnetic core exhibiting two states of magnetic remanence, coil means coupled to said core, said coil means having a first terminal to receive electric pulses tending to drive said core to one state of remanence and another terminal to receive electric pulses tending to drive said core to another state of remanence, a load means having a varying impedance coupled in parallel to a portion of said coil means, and a clamping device connected to said portion of said coil means and said load means.

2. The combination comprising a magnetic core exhibiting two states of magnetic remanence, coil means coupled to said core, said coil means having a first terminal to receive first electric pulses tending to drive said core to one state of remanence and another terminal to receive second electric pulses tending to drive said core to another state of remanence, said coil means coacting with said magnetic core as to offer a high impedance to said first electric pulses when said core is in a first state of remanence and a low impedance to said first electric pulses when said core is in a second state of remanence, a load means connected in parallel to a portion of said coil means, and a clamping device connected to said portions of said coil means and said load means.

3. The combination defined in claim 2 further comprising a source of first electric pulses connected to said first terminal of said coil means and a clamping device connected to said connection of said source to said coil means.

4. The combination comprising a magnetic core exhibiting two states of magnetic remanence, coil means coupled to said core, said coil means having a first terminal to receive first electric pulses tending to drive said core to one state of remanence and another terminal to receive electric pulses tending to drive said core to another state of remanence, said coil means coacting with said magnetic core as to offer a high impedance to said first electric pulses when said core is in a first state of remanence and low impedance to said first electric pulses when said core is in a second state of remanence, a load means connected in parallel to a portion of said coil means, a source of first electric pulses connected to said first terminal, and a clamping device connected to said first terminal.

5. The combination comprising a core of magnetic material exhibiting two states of remanence, a first, second and third electric winding coupled to said core, a source of power pulses coupled to one end of said first winding, a load element having a varying impedance connected in parallel with said second winding, a source of signal pulses connected to said third winding, and a first clamping device connected to said second winding and said load.

6. The combination defined in claim 5 wherein said source of power pulses is a constant current source and further including a second clamping device connected to said source of power pulses and said first winding.

7. A combination comprising a core of magnetic material, said magnetic material exhibiting two states of magnetic remanence, a first, second and third winding coupled to said core, a source of power pulses coupled to one end of said first winding, said power pulses tending to drive said core to one state of magnetic remanence, a load element connected in parallel with said second winding, a source of signal pulses connected to said third winding, said signal pulses tending to drive said core to another state of magnetic remanence, and a clamping device connected to said second winding and said load.

8. A combination comprising a core of magnetic material, said magnetic material exhibiting two states of magnetic remanence, a first, second and third winding coupled to said core, a source of power pulses coupled to one end of said first winding, said power pulses tending to drive said core to one state of magnetic remanence, a load element connected in parallel with said second winding, a source of signal pulses connected to said third winding, said signal pulses tending to drive said core to another state of magnetic remanence, and a clamping device connected to said source of power pulses and said first winding.

9. The combination defined in claim 1 wherein said clamping device comprises a unidirectional current conducting element and a source of reference potential connected to said element.

10. The combination defined in claim 9 wherein said element comprises a cathode electrode connected to said source of reference potential and an anode electrode connected to said coil means and said load means.

11. The combination defined in claim 4 wherein said clamping device comprises a unidirectional current conducting element and a source of reference potential connected to said element.

12. The combination defined in claim 11 wherein said element comprises an anode electrode connected to said source of reference potential and a cathode electrode connected to said first terminal.

13. The combination defined in claim 6 wherein said first clamping device comprises a first rectifier and a first source of reference potential, said first rectifier being connected between said first source and said second winding and said second clamping device comprises a second rectifier and second source of reference potential, said second rectifier being connected between said second source and said first winding.

14. Apparatus for determining the state of a bistable saturable magnetic element comprising winding means on said element, means coupled electrically and non-inductively to the winding means for providing an indicative output, means for supplying at least one signal, and means for applying the signal electrically and non-inductively to said winding means including means for limiting said signal to a predetermined amplitude across the winding means, the arrangement being such that when the element is in a first state, said signal causes shift of said element to a second state and provides a substantial output indicative of said first state, said substantial output having an amplitude of substantially said predetermined amplitude, whereas when the element is in said second state said signal causes no shift of the core element and provides no substantial output.

15. Apparatus for determining the state of a bistable magnetic core element comprising winding means on said element, means coupled electrically and non-inductively to the winding means for providing an indicative output, means coupled electrically to said winding means for providing an interrogating signal thereto including means for limiting said signal to a predetermined amplitude across the winding means, the arrangement being such that when the core element is in a first state said signal causes at least a partial shift of the core element to a second state and provides a substantial output indicative of said first state, whereas when the core element is in said second state, said signal causes no shift of the core element and provides no substantial output.

16. Apparatus as in claim 15 wherein said means for providing an interrogating signal includes resistor means, said interrogating signal being a pulse of voltage greater than said predetermined amplitude.

17. Apparatus as in claim 15 wherein said means for providing an interrogating signal includes impedance means coupled to said winding means, and means coupling a steady signal across said winding means, the arrangement being such that said steady signal affects said winding means as said interrogating signal only when current through said impedance means is blocked.

18. Apparatus for determining the state of a bistable saturable magnetic core element comprising winding means on said element, output means including a junction for providing an indicative output, a source of reference potential, unidirectional means coupling said source to the junction, and means for providing an interrogating signal to said junction, the arrangement being such that when the core element is in a first state said interrogating signal causes at least partial shift of the core element to a second state and provides through said output means a substantial output having a voltage corresponding to said reference potential, whereas when the core element is in said second state said interrogating signal causes no shift of the core element and no substantial output.

19. Apparatus for determining the state of a magnetic element having two bistable states comprising a winding on said element, a junction, means coupling said winding to the junction, signal amplitude limiting means coupled to said junction, and means for applying at least one interrogating signal to said junction to cause at said junction an output signal which is limited in amplitude by said limiting means and which has a long or short duration corresponding respectively to said two states.

20. Apparatus for determining the state of a magnetic element having two bistable states comprising a winding on said element, a junction, means directly connecting the junction to said winding, means directly connected to said junction for receiving at least one interrogating signal, means directly connected to said junction for receiving an output signal from said winding upon receipt of an interrogating signal at said junction, and signal amplitude limiting means directly connected to said junction for limiting the maximum amplitude of the said output signal to a predetermined value, the arrangement being such that the output signal has a relatively long or relatively short duration according to which of said two states said element is in upon receipt of an interrogating signal.

References Cited in the file of this patent

UNITED STATES PATENTS 2,708,722 An Wang -------------- May 17, 1955